F. CONRAD & J. P. NIKONOW.
STARTING MECHANISM FOR AUTOMOBILES.
APPLICATION FILED JULY 2, 1913.

1,215,490.

Patented Feb. 13, 1917.
2 SHEETS—SHEET 1.

WITNESSES:

INVENTORS
Frank Conrad
John P. Nikonow
BY
Wesley G. Carr
ATTORNEY

F. CONRAD & J. P. NIKONOW.
STARTING MECHANISM FOR AUTOMOBILES.
APPLICATION FILED JULY 2, 1913.

1,215,490.

Patented Feb. 13, 1917.
2 SHEETS—SHEET 2.

UNITED STATES PATENT OFFICE.

FRANK CONRAD, OF SWISSVALE, AND JOHN P. NIKONOW, OF PITTSBURGH, PENNSYLVANIA, ASSIGNORS TO WESTINGHOUSE ELECTRIC AND MANUFACTURING COMPANY, A CORPORATION OF PENNSYLVANIA.

STARTING MECHANISM FOR AUTOMOBILES.

1,215,490.     Specification of Letters Patent.     Patented Feb. 13, 1917.

Application filed July 2, 1913. Serial No. 776,949.

*To all whom it may concern:*

Be it known that we, FRANK CONRAD, a citizen of the United States, and a resident of Swissvale, in the county of Allegheny and State of Pennsylvania, and JOHN P. NIKONOW, a subject of the Czar of Russia, and a resident of Pittsburgh, in the county of Allegheny and State of Pennsylvania, have invented a new and useful Improvement in Starting Mechanism for Automobiles, of which the following is a specification.

Our invention relates to starting mechanisms for automobiles and it has particular reference to such mechanisms as embody dynamo-electric machines which are adapted to operate either as generators or as motors.

Our invention has for its object to provide a simple structure for connecting the dynamo-electric machine to an engine shaft by means of which different speed ratios are automatically secured when the dynamo-electric machine operates respectively as a motor and as a generator.

In the employment of electric machines for starting the engines of automobiles or other motor vehicles, it is advantageous to combine in one machine the functions of a motor and of a generator for furnishing current for lighting, ignition and charging a storage battery.

In order to keep the size of the dynamo-electric machine within proper limits, it is essential that reduction gear mechanism be employed when it is operated as a motor and that a different speed ratio be provided when acting as a generator to avoid the excessive speed that would result when the engine is driving. It is impractical to employ a manually operated device to change the gear connections for altering the speed ratio, because the operator may fail to make the change until after the dynamo-electric machine has attained an abnormal speed.

Our invention provides a generator which operates as a motor at a high speed through reduction-gear mechanism to start the gas engine of an automobile. The dynamo-electric machine is then driven at a different speed ratio by the engine, the connection being changed automatically upon the starting of the engine. The speed ratios employed may be, for example, 16 to 1 in the first instance, and 1 to 1 in the second.

Figure 1:
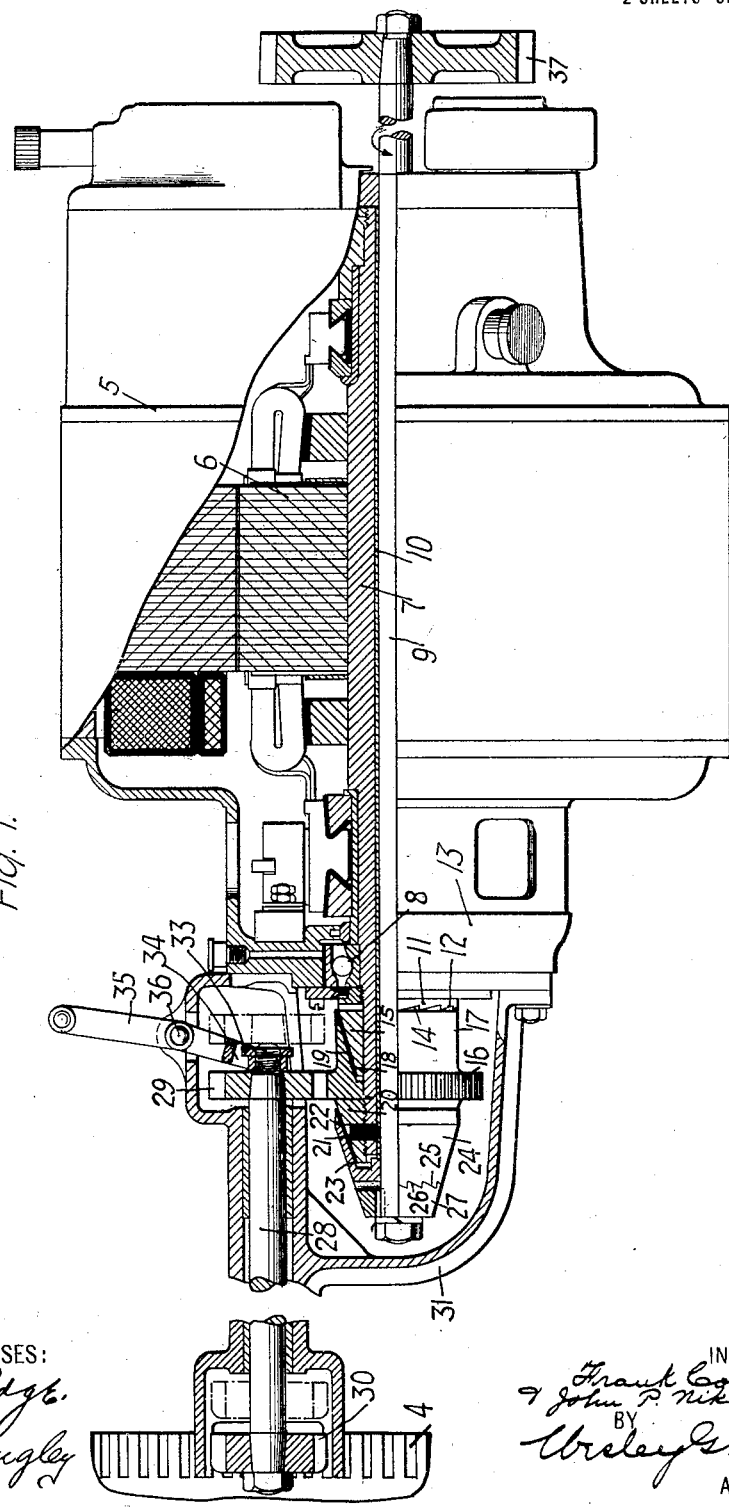
Figure 2:
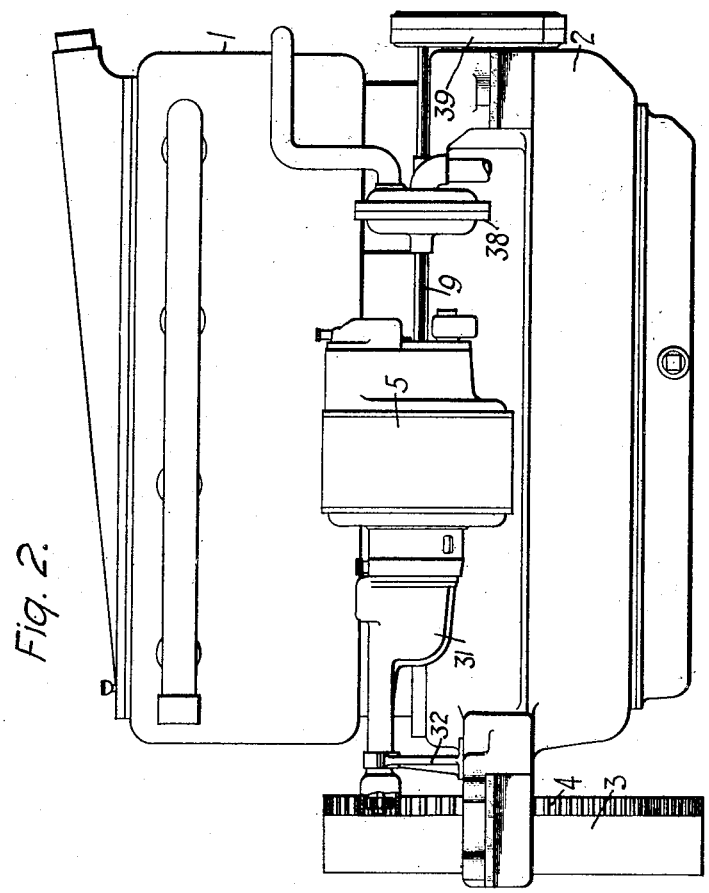

The details of our invention will be described in connection with the accompanying drawings in which Figure 1 is a side view, partially in elevation and partially in section, of a generator and connecting gear mechanism. Fig. 2 is a side view, in elevation, of a gas engine with our invention applied thereto.

Referring particularly to the drawings, a gas engine 1, which is adapted to be employed as the prime mover of an automobile, comprises a crank case 2 and a fly wheel 3 that is provided with gear teeth 4. A dynamo-electric machine 5, which is adapted to operate either as a motor or as a generator, is attached, by any suitable supporting means, to the crank case 2 and is connected to the gear teeth 4 by mechanism best shown in Fig. 1.

The armature 6 of the dynamo-electric machine is provided with a hollow shaft 7 mounted to rotate in the usual bearings 8. A shaft 9 is rotatably mounted in a bearing bushing 10 in the bore of the hollow shaft 7. A collar member 11, having cam teeth 12 in its outer face, is threaded on the shaft 7 adjacent the end casing 13 and coacts with the oppositely disposed teeth 14 of a cone-shaped sleeve member 15 which is loosely and slidably mounted on the shaft 7. A gear wheel 16 is loosely mounted on the shaft 7 and is provided with a flange 17 having an inner surface 18 shaped to coact with the conical surface 19 of the member 15 to form a friction clutch.

The shaft 7 is also provided with a cone-shaped member 20 which is fixed thereon by a set screw 21 and has a conical surface 22 to coact with the inner surface 23 of a member 24 that is loosely and slidably mounted on the shaft 9 to form a second clutch. The member 24 is provided, at its outer end, with cam teeth 25 which coact with the similar and oppositely disposed teeth 26 of a collar member 27 that is fixed on the shaft 9. It will be noted that the members 15 and 24, which are loosely and slidably mounted on the shafts 7 and 9, respectively, have a limited movement which is less than that of the depth of the cam teeth on the several members 11, 15, 24 and 27. This construction insures that a relative movement between the members of either pair of coacting toothed members will cause a longitudinal movement of the respective slidably mounted member to effect the engagement of the coacting friction clutch members.

A slidable shaft 28 bears at its respective ends, gear wheels 29 and 30 which are adapted to be meshed at times with the gear wheel 16 and the fly wheel gear teeth 4, respectively. The shaft 28 has a bearing in a housing 31 which is fastened to the end casing 13 and is supported by a bracket 32, and which incloses the several clutch members and gear wheels. The shaft 28 is provided with a collar member 33 to be engaged by the bifurcated end 34 of a lever 35 that has a pivotal support at 36 on the housing 31. The lever 35 may be connected by any suitable means (not shown) to a lever or pedal within convenient reach of the operator.

A gear wheel 37 is mounted upon the rear end of the shaft 9 and is connected to the engine shaft by any suitable gear mechanism (not shown). As shown in Fig. 2, a pump 38 may be operated by the shaft 9 to circulate the water in the cooling system of the gas engine 1. A housing 39 incloses the gear wheel 37 and its connected gear mechanism.

Assuming that the various parts are stationary and that it is desired to start the engine, the operator actuates the lever 35 to shift the gear wheels 29 and 30 from their respective inoperative positions, indicated by dotted lines in Fig. 1, into mesh with the gear wheel 16 and the gear teeth 4, respectively. The starting circuit is then closed by any suitable means (not shown) and the dynamo-electric machine operates as a motor to rotate the hollow shaft 7, and, with it, the collar 11 in the direction of the arrow. The cam teeth 12 of the collar 11 then move relatively to the cam teeth 14 of the member 15 because of the inertia of the latter member and the resulting wedging action slides the member 15 outwardly until the conical surfaces 18 and 19 are in engagement. The member 15 and the gear wheel 16 then rotate with the shaft 7 and the engine shaft is rotated through the gear wheel 29, the shaft 28, the gear wheel 30 and the fly wheel gear teeth 4. While the motor is driving, the shaft 9 is being rotated by the engine shaft and the gear mechanism connected to the gear wheel 37, in the same direction as the shaft 7 but at a lower speed. The clutch members 20 and 24 do not engage because there is no tendency for the member 27 to overrun the member 24.

When the engine starts under its own power, the operator shifts the lever 35 to return the gear wheels 29 and 30 to their inoperative positions. The shaft 9 will be driven at an increased speed by the engine and the member 27 will tend to overrun the member 24 and the wedging action of the respective cam teeth 26 and 25 will cause the engagement of the respective friction clutch surfaces 22 and 23 of the members 24 and 20. The armature 6 will then be driven by the engine at a low speed ratio and the current of the dynamo-electric machine operating as a generator may be utilized for various purposes in connection with the operation of a motor vehicle. In case the operator should fail to disconnect the gear mechanism at the proper time, the changes of speed ratio will be effected automatically. The increased speed of the engine, as it operates under its own power, drives the gear wheel 16 and the clutch member 17 faster than the normal speed of the armature shaft 7, and the collar member 11. As a result, the wedging action of the teeth 12 and 14 is broken and the clutch connection is released because of the engagement of the respective ends of the teeth 12 and 14, thus allowing the gear wheel 16 and the clutch member 17 to overrun the shaft 7. The connection of the clutch members 20 and 24 will then occur as above described.

Many changes in our invention will occur to one skilled in the art to which it appertains and it is understood that such modifications may be made as fall within the limits of the appended claims.

We claim as our invention:

1. The combination with an engine member, of a dynamo-electric machine having an armature provided with a hollow shaft, a rod within said hollow shaft, and means for operatively connecting said rod to said engine member and to said shaft.

2. The combination with an engine shaft, of a dynamo-electric machine having a hollow armature shaft, a shaft loosely mounted in said hollow shaft and means for operatively connecting each of said last named shafts to said engine shaft and to each other.

3. The combination with an engine member, of a dynamo-electric machine having a hollow armature shaft and a shaft rotatably mounted in said hollow shaft, means for operatively connecting each of the shafts to said engine member at different speed ratios, and a one-way clutch between said shafts.

4. The combination with an engine member, of a dynamo-electric machine having a hollow armature shaft and a shaft rotatably mounted in said hollow shaft, means for operatively connecting each of said shafts to said engine member, and means for operatively connecting said shafts only when one of said shafts is the driving member.

5. The combination with an engine member, of a dynamo-electric machine having a hollow armature shaft and a shaft rotatably mounted in said hollow shaft, means for operatively connecting each of said shafts to said engine member at different speed ratios, and means for operatively connecting said shafts.

6. The combination with an engine shaft, of a dynamo-electric machine having a hollow armature shaft, a shaft rotatably mounted in said hollow shaft, and means for operatively connecting said last named shafts to each other and to said engine shaft at different speed ratios.

7. The combination with two alined rotatable shafts, of means for operatively connecting said shafts at a certain speed ratio when one of said shafts is the driving member and for automatically connecting said shafts at another speed ratio when the driving member becomes the driven member.

8. The combination with an engine shaft and a dynamo-electric machine having an armature shaft, of a shaft alined with said armature shaft and operatively connected to said engine shaft, and means for automatically connecting said armature shaft to said alined shaft at different speed ratios.

9. The combination with an engine shaft and a dynamo-electric machine having an armature shaft, of a third shaft operatively connected to said engine shaft at a fixed speed ratio, means comprising a one-way clutch for operatively connecting said armature shaft to said engine shaft, and a one-way clutch between said armature shaft and said third shaft.

10. The combination with an engine shaft and a gear wheel connected to said shaft, of a dynamo-electric machine having an armature shaft, a gear wheel on said armature shaft and means comprising a slidable shaft, and gear wheels on said slidable shaft for simultaneously engaging the gear wheels on said engine shaft and said armature shaft, respectively.

11. The combination with an engine shaft and a dynamo-electric machine, of means comprising automatic clutches and a slidable shaft for operatively connecting said machine to said engine shaft, and a housing which incloses said clutches and forms a bearing for said slidable shaft.

12. The combination with a rotatable shaft, of a clutch member rotatably mounted on said shaft, a second clutch member slidably mounted on said shaft, means for automatically sliding said second clutch member into engagement with the rotatable clutch member, a clutch member fixed on said shaft, a second shaft, a slidable clutch member on said second shaft which coacts with said fixed clutch member, and means for automatically effecting the engagement of the last named coacting clutch members.

13. The combination with a rotatable shaft, of a clutch member rotatably mounted thereon, a coacting clutch member slidably mounted on said shaft and provided with cam teeth, a member fixed to said shaft and having cam teeth which coact with the teeth on said clutch member, a clutch member fixed on said shaft, a second rotatable shaft, a clutch member slidably mounted on said second shaft for coacting with said fixed clutch member and provided with cam teeth, a member fixed on said second shaft and provided with cam teeth for coacting with the teeth on the last named clutch member.

14. The combination with an engine member, of a dynamo-electric machine having a tubular armature shaft, a rod within the bore of said shaft and movable relatively thereto, and means for operatively connecting said rod to said engine member and to said shaft.

In testimony whereof, we have hereunto subscribed our names this 28th day of June 1913.

FRANK CONRAD.
JOHN P. NIKONOW.

Witnesses:
C. A. ATHERTON,
B. B. HINES.

Copies of this patent may be obtained for five cents each, by addressing the "Commissioner of Patents, Washington, D. C."